United States Patent

[11] 3,580,010

| [72] | Inventor | Sidney L. Fisher<br>Renton, Wash. |
|---|---|---|
| [21] | Appl. No. | 861,866 |
| [22] | Filed | Sept. 29, 1969 |
| [45] | Patented | May 25, 1971 |
| [73] | Assignee | Spider Staging, Inc.<br>Seattle, Wash. |

[54] UNIVERSAL JOINT
7 Claims, 5 Drawing Figs.

[52] U.S. Cl. .................................................. 64/9
[51] Int. Cl. .................................................. F16d 8/18
[50] Field of Search .......................................... 64/9, 16, 17, 17 (S), 18, 21, 7; 287/87

[56] References Cited
UNITED STATES PATENTS

| 1,241,118 | 9/1917 | Hoskins .................... | 64/9 |
| 3,066,502 | 12/1962 | Forrest .................... | 64/21 |

*Primary Examiner*—Fred C. Mattern, Jr.
*Assistant Examiner*—Randall Heald
*Attorney*—Graybeal, Cole and Barnard ABSTRACT: The essential components are a pair of identical end members, a coupler member, and a retainer ring. Each end member is connectable to the shaft part and includes cylindrical pivot head means having an axis perpendicular to the main axis of the end member. The coupler member comprises a pair of transverse socketways, each of which is circular in cross section and extends perpendicular to the other socketway. The head means of one end member is slid axially into one of the socketways and the head means of the other end member is slid axially into the second socketway. A retainer ring is slid longitudinally over one of the end members into a position surrounding the coupler member in which said ring covers the end openings of the socketways.

Patented May 25, 1971
3,580,010
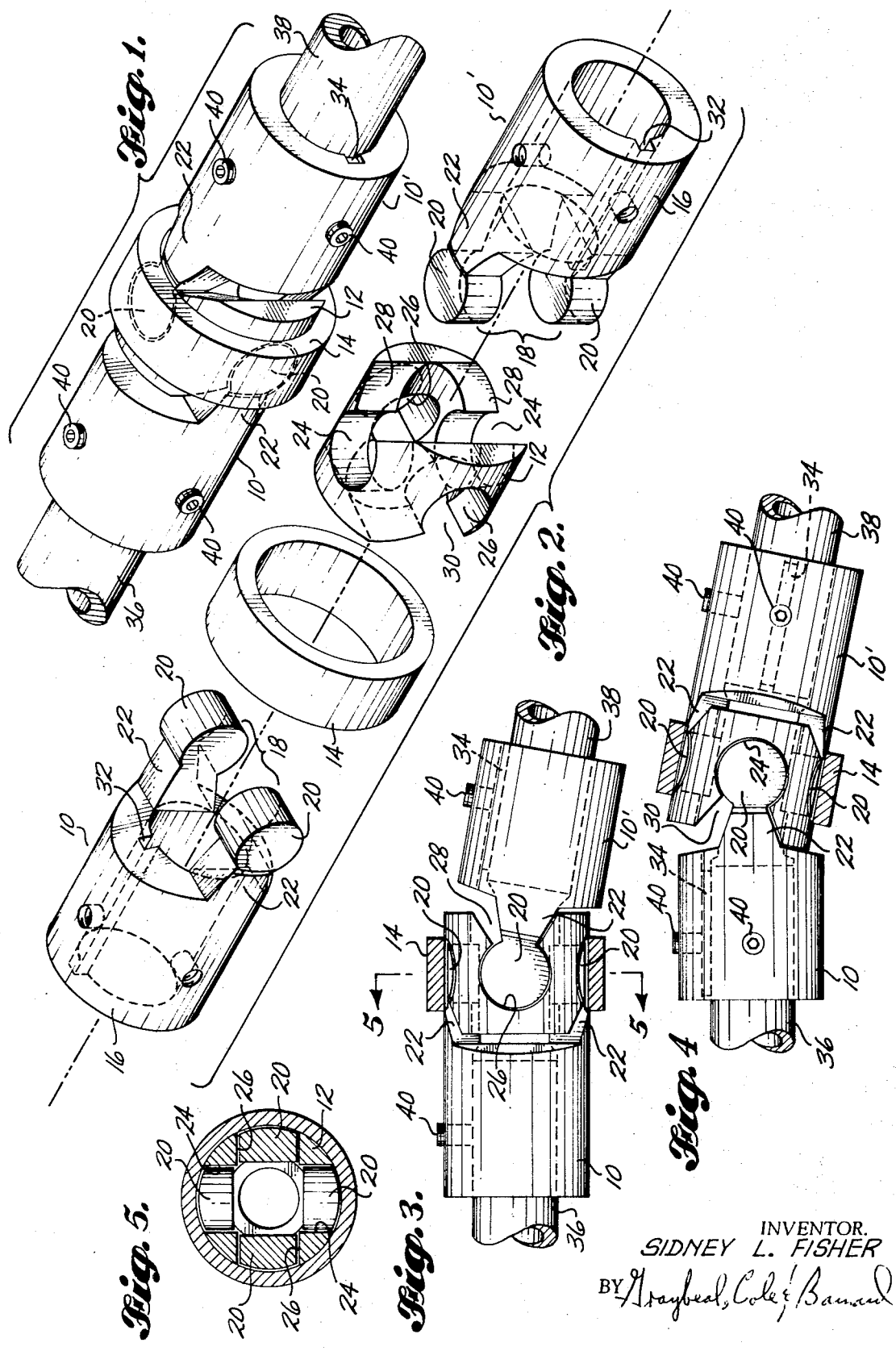
INVENTOR.
SIDNEY L. FISHER
BY Graybeal, Cole & Barnard
ATTORNEYS

UNIVERSAL JOINT

BACKGROUND OF THE INVENTION

1. Field of the Invention

This invention relates to a new universal joint, and particularly to a four part universal joint constructed to hold together even after severe wear of the parts, having no pins which can be thrown by centrifugal force in the event of a breakdown of the joint.

2. Description of the Prior Art

Conventional universal joints used for coupling together two sections of a rotating shaft comprise a pair of pivot pins, each of which is perpendicular to the other. When this type of joint breaks down a complete break usually occurs and quite often one or both of the pins are thrown by centrifugal force, creating a hazard to workmen in the area and/or the possibility of property damage.

In some installations the parting of the joint is by itself a serious problem. For example, in suspended stagings of the type shown by my U.S. Pat. No. 2,998,094, for example, the drive shaft which turns the winch drum causing up and down travel of the staging includes a universal joint. Such joint is located below the operator's station. If it were to part, the drive mechanism would be disabled and in most cases the operator would be stranded in a helpless position suspended above the ground. There are other installations in which an untimely parting of a universal joint would cause dive consequences which if at all possible should be avoided.

SUMMARY OF THE INVENTION

The universal joint of the present invention is characterized by a construction involving no pivot pins. The elements providing pivotal movement are sturdy yet simple. They establish a pair of perpendicular knuckle joints involving ball and socket type connections. A retainer ring surrounds such elements and prevents their disengagement even after the elements have worn to a condition requiring replacement of the universal joint.

According to the invention the universal joint includes a coupler member formed to include a pair of transverse socketways. Each socketway is circular in cross section and extends perpendicular to the other socketway. The coupler member includes end avenues into the socketways of a width smaller than the diameter of its socketway. The joint further includes a pair of identical end members, each having a body portion connectable to a shaft, e.g. by means of setscrews, etc. Each end part has rounded pivot head means at its inner end sized to snugly fit within one of the socketways, and a neck portion connecting its pivot head means to its body portion. The pivot head means of each end member is slid sideways of the coupler member into a different one of the socketways of the coupler member. This places the neck portions of the end members within the end avenues. The neck portions are constructed to be narrower than the end avenues so that relative pivotal movement can occur between the coupler member and the end members about the common axes of the engaged head means and the slideways. The fourth element of the universal joint is a retainer ring which is slidable axially over one of the end members into a position surrounding the coupler member and covering the ends of the two socketways. In this position the retainer ring blocks unintentional removal of the pivot head means from the socketways.

BRIEF DESCRIPTION OF THE DRAWING

FIG. 1 is an isometric view of the universal joint of the present invention, with the parts thereof shown in an assembled position and shown connecting together two parts of a tubular shaft;

FIG. 2 is an exploded isometric view of the universal joint shown by FIG. 1;

FIG. 3 is a side elevational view of the assembly of FIG. 1, with one end member of the universal joint and the shaft part connected thereto shown in a position of maximum angular deviation from the axis of the coupler;

FIG. 4 is a top plan view of the universal joint assembly showing such end member of the coupler and the shaft part connected thereto in a position of maximum angular deviation from the axis of the second end part of the joint; and FIG. 5 is a cross-sectional view taken through the longitudinal center of the universal joint, substantially along line 5–5 of FIG. 3.

DESCRIPTION OF THE PREFERRED EMBODIMENTS

Referring more specifically to the several figures of the drawing, the universal joint of the present invention is shown to comprise only four parts. They are two end members 10, 10', a coupler member 12 and a retainer ring 14. Preferably, the end members 10, 10' are identical.

As best shown by FIG. 2, each end member 10, 10' comprises an elongated tubular body 16. The inner ends of the joint members 10, 10' are in the form of rounded pivot head means 18, shown to be of two part construction, with each pivot head member 20 being cylindrical in form and being coaxially related with the other part. Neck portions 22 connect the head members 20 with the body portions 16 of the end member 10, 10'.

The coupler 12 has a basic tubular form. It includes a pair of intersecting transverse bores or socketways 24 which extend through the member 12 at a right angle to each other. The end portions of the member 12 are cut away axially endwise of each socketway 24, 26, so as to provide an end avenue 28 endwise outwardly of the slideway 24 and a similar end avenue 30 in the opposite end portion of coupler 12 extending endwise outwardly from the socketway 26.

The socketways 24, 26 are sized to somewhat snugly receive the pivot heads 20. The avenues 28, 30 widen from their inner to their outer ends and at their inner ends are of a width that is smaller than the diameter of the pivot heads 20. The neck portions 22 of the end member 10, 10' widen as they extend from their outer locations of attachment with the pivot heads 20 to their inner locations of attachment with the body portions 16. They are narrower throughout their lengths than the end avenues 28, 30 in which they are situated when the pivot heads 20 are located within the socketways 24, 26. By way of typical and therefore nonlimitive example, the angle of divergence of the side edges of the end avenues may be about sixty-six (66°) degrees and the angle of divergence of the side edges of the neck portions 22 may be thirty-six (36°) degrees, giving the joint about a fifteen (15°) degree throw.

The pivot head means of each end member 10, 10', composed of the two pivot heads 20 of the part, is axially aligned with the corresponding socketway 24, 26 and is then moved endwise into its socketway.

As clearly shown by FIGS. 3—5, when the two end members 10, 10' are coupled to the connector member 12 the axes of the pivot heads 20 substantially coincide with the axes of the socketways 24, 26, the axes of the socketways 24, 26 substantially pass through or intersect the longitudinal axes of member 12, and the axes of socketways 24, 26 are perpendicular to each other.

The retainer ring 14 is slid over one of the end members 10, 10' into a position around coupler 12 and immediately surrounding the ends of the socketways 24, 26. Ring 14 may be heat enlarged before being slid on coupler member 12 and be constructed to be of such a size that when it cools it tightly hugs the member 12 and is in that manner firmly secured to the member 12. Of course, other techniques or means may also be employed for securing the ring 14 to the coupler member 12.

The retainer ring 14 is shown to be axially shorter than the coupler member 12. In the regions of the pivot head 20 the end members 10, 10' are smaller in outside diameter than the coupler member 12 and such outside diameter is smaller than the inside diameter of the retainer ring 14. This is so that the retainer ring 14 does not grip the pivot heads 20 and restrain free movement of the end members 10, 10' relative to the coupler member 12.

The end members 10, 10' are shown to each including an elongated key slot 32 for receiving a key 34 which serves to key the end members 10, 10' to the shaft parts 36, 38 for conjoint rotation. Setscrews 40 or the like may be used for securing the end parts 10, 10' against unwanted axial movement along shaft parts 36, 38.

The universal joint of this invention is quite simple in construction yet is durable and capable of achieving a long use life. A principal advantage of the joint is that it is nearly impossible for the retainer ring 14 to break or for the pivot heads 20 to break loose from the neck portions 22. As long as these parts do not break the universal joint will not part into two pieces, regardless of the condition of the elements 20, 12 making up the two pivot joints. These parts 12, 20 can be sufficiently worn or distorted that the universal joint should be replaced and still the joint will hold together. Even in the unexpected event the ring 14 should break, it would probably stay at least partially about the coupler member 12 and prevent disengagement of the end parts 10, 10' from coupler member 12. It is safe to work around the joint because the joint includes no pivot pins which can be thrown radially outwardly by centrifugal force in the rare event of a complete breakdown.

Also, the nonexistence of cross pins makes it possible for the joint to have an unobstructed interior opening through the center of member 12. As a result it is possible to run an electrical wire, a conduit or some other flexible member through the entire joint region.

What I claim is:

1. A universal joint comprising:
   a coupler member including a pair of transverse socketways, each said socketway being circular in cross section and extending perpendicular to the other socketway, said coupler member including end avenues into the socketways, each said avenue being of a width smaller than the diameter of its socketway;
   a pair of end members to be joined by said coupler member, each said part having rounded head means at a first end thereof sized to snugly fit within a related one of said socketways, and a neck portion that is narrower than the end avenue into its socketway, thereby permitting limited pivotal movement of each said end member relative to said coupler member; and
   a retainer ring sized to snugly surround said coupler member and to cover at least portions of the ends of said socketways, so as to block movement of the heads out from their respective socketways.

2. A universal joint according to claim 1, wherein said end members are tubular and each includes a second end portion connectable to a shaft.

3. A universal joint according to claim 2, wherein the head means of each end member comprises a pair of right cylindrical head elements coaxial on a transverse pivot axis which is perpendicular to the longitudinal axis of the end member.

4. A universal joint according to claim 1, wherein each end member includes a body portion and said neck portion diverges from said head means to a location of connection with said body portion, and wherein the guide avenues of the coupler member diverge outwardly from the socketways at a larger angle than the angle of divergence of said neck portions.

5. A universal joint according to claim 4, wherein said body portion is tubular and includes means for securing it to the end of a shaft part.

6. A universal joint according to claim 4, wherein the retainer ring is fixed in position on the coupler member so that it cannot inadvertently slide endwise off from the coupler member.

7. A universal joint according to claim 4, wherein the retainer ring is shrunk fit onto said coupler member.